(12) United States Patent
Lou et al.

(10) Patent No.: US 10,387,008 B2
(45) Date of Patent: Aug. 20, 2019

(54) METHOD AND DEVICE FOR SELECTING AN OBJECT FROM A LIST

(71) Applicant: VOLKSWAGEN AKTIENGESELLSCHAFT, Wolfsburg (DE)

(72) Inventors: Jian Lou, Berlin (DE); Tobias Budzynski, Berlin (DE); Mathias Kuhn, Berlin (DE)

(73) Assignee: Volkswagen AG (DE)

( * ) Notice: Subject to any disclaimer, the term of this patent is extended or adjusted under 35 U.S.C. 154(b) by 315 days.

(21) Appl. No.: 14/888,551

(22) PCT Filed: Feb. 21, 2014

(86) PCT No.: PCT/EP2014/053418
§ 371 (c)(1),
(2) Date: Nov. 2, 2015

(87) PCT Pub. No.: WO2014/177297
PCT Pub. Date: Nov. 6, 2014

(65) Prior Publication Data
US 2016/0062614 A1    Mar. 3, 2016

(30) Foreign Application Priority Data

May 2, 2013    (DE) .................. 10 2013 007 576

(51) Int. Cl.
*G06F 3/0488*    (2013.01)
*G06F 3/0484*    (2013.01)
(Continued)

(52) U.S. Cl.
CPC .......... *G06F 3/04842* (2013.01); *B60K 35/00* (2013.01); *B60K 37/06* (2013.01);
(Continued)

(58) Field of Classification Search
CPC .. G06F 3/04842; G06F 3/0488; G06F 3/0485; G06F 3/0484
See application file for complete search history.

(56) References Cited

U.S. PATENT DOCUMENTS

2010/0153844 A1    6/2010  Hwang et al.
2010/0211872 A1    8/2010  Rolston et al.
(Continued)

FOREIGN PATENT DOCUMENTS

DE       19941956 A1    3/2001
DE    102006032118 A1    1/2008
(Continued)

OTHER PUBLICATIONS

Office Action for Korean Patent Application No. 10-2015-7032694; dated Oct. 14, 2016.
(Continued)

*Primary Examiner* — Andrea C Leggett
(74) *Attorney, Agent, or Firm* — Barnes & Thornburg LLP

(57) ABSTRACT

A method for selecting an object from a list. A portion of a list is displayed using graphical objects on a display surface and functions are assigned to each graphical object. The list is displayed as a stack in which a first graphical object is completely visible at the top of the stack, and other graphical objects are only partly visible perspectively behind the first graphical object, wherein one of the other graphical objects is selected by a selection operating process. The first graphical object displayed at the top of the stack disappears when a selection operating process has been detected such that one of the other graphical objects is displayed at the top of the stack after the first graphical object has disappeared, and the
(Continued)

second graphical object is automatically selected so that the function assigned to the second graphical object is carried out.

9 Claims, 3 Drawing Sheets

(51) Int. Cl.
*B60K 35/00* (2006.01)
*G06F 3/0482* (2013.01)
*B60K 37/06* (2006.01)
*G06F 3/0485* (2013.01)

(52) U.S. Cl.
CPC .......... *G06F 3/0482* (2013.01); *G06F 3/0485* (2013.01); *G06F 3/0488* (2013.01); *B60K 2350/1004* (2013.01); *B60K 2350/1028* (2013.01)

(56) References Cited

U.S. PATENT DOCUMENTS

| | | | |
|---|---|---|---|
| 2011/0296351 A1 | 12/2011 | Ewing, Jr. et al. | |
| 2014/0143683 A1* | 5/2014 | Underwood, IV | H04L 51/38 |
| | | | 715/752 |

FOREIGN PATENT DOCUMENTS

| | | |
|---|---|---|
| DE | 102008051051 A1 | 3/2010 |
| DE | 102008052485 A1 | 4/2010 |
| DE | 102009019560 A1 | 11/2010 |
| DE | 102009019563 A1 | 11/2010 |
| DE | 102010022721 A1 | 3/2011 |
| DE | 102009048834 A1 | 4/2011 |
| DE | 102013000751 A1 | 7/2014 |
| KR | 20110117170 A | 10/2011 |
| WO | 2009143076 A2 | 11/2009 |

OTHER PUBLICATIONS

Search Report for German Patent Application No. 10 2013 007 576.9; dated Dec. 20, 2013.
Search Report for International Patent Application No. PCT/EP2014/053418; dated Apr. 30, 2014.

* cited by examiner

METHOD AND DEVICE FOR SELECTING AN OBJECT FROM A LIST

PRIORITY CLAIM

This patent application is a U.S. National Phase of International Patent Application No. PCT/EP2014/053418, filed 21 Feb. 2014, which claims priority to German Patent Application No. 10 2013 007 576.9, filed 2 May 2013, the disclosures of which are incorporated herein by reference in their entirety.

FIELD

Illustrative embodiments relate to a method for selecting an object from a list. In the method, a subset of a list is displayed on a display surface using graphical objects. Functions are at least partially respectively assigned to the graphical objects. The list is displayed as a stack in which a first graphical object is completely visible at the top of the stack and further graphical objects are displayed in an only partially visible manner perspectively behind the first graphical object. A selection operation is used to select one of the further graphical objects.

Illustrative embodiments also relate to a device for selecting an object from a list, having a display device with a display surface. The device also has a memory for storing a list, which comprises a multiplicity of graphical objects which can be at least partially displayed on the display surface, and for storing functions assigned to the graphical objects. The device also comprises a control device which is coupled to the display device and can be used to control the display represented on the display surface in such a manner that a subset of the list can be displayed using graphical objects. In this case, the list is displayed as a stack in which a first graphical object is completely visible at the top of the stack and further graphical objects are displayed in an only partially visible manner perspectively behind the first graphical object. The device also comprises an operating device which can be actuated by a user to select one of the further graphical objects by means of a selection operation.

BACKGROUND

Different items of information which visually present, in particular, operation-related data relating to the vehicle for the driver are conventionally displayed in a vehicle. Traffic-related data may also be presented for the driver in the vehicle. Analog mechanical display instruments were previously used to display this information. The instruments were arranged, in particular, inside the so-called combination instrument behind the steering wheel in the vicinity of the driver's primary field of vision. The combination instrument is used, in particular, to display the speed, the tank contents, the radiator temperature and other operation-related information relating to the vehicle.

With the increase in electronic devices in the vehicle, it became necessary to display a larger amount of information in the vehicle. Modern vehicles comprise, for example, a multiplicity of driver assistance systems, the information from which must be displayed in the vehicle. Vehicles often also comprise a navigation system. Such a navigation system can be used to display digital geographical road maps with a route and possibly various items of additional information. Finally, modern vehicles often comprise communication and multimedia applications, including a mobile telephone interface, and devices for playing back music and speech. The possibility of displaying information must also exist for these applications in the vehicle.

For this reason, multifunction operating systems are used in vehicles, which systems comprise one or more multifunction display(s) and operating elements which can be used to operate the various devices included in the vehicle. In this case, operation is assisted or guided by the information represented on the multifunction display. The operating system can also be used to select which information is intended to be displayed on the multifunction display.

Disclosed embodiments provide a method and a device in which the performance of a function of a particular object in a list can be easily and quickly initiated.

BRIEF DESCRIPTION OF THE FIGURES

Disclosed embodiments are now explained with reference to the drawings.

DETAILED DESCRIPTION OF THE DISCLOSED EMBODIMENTS

Figure 1:
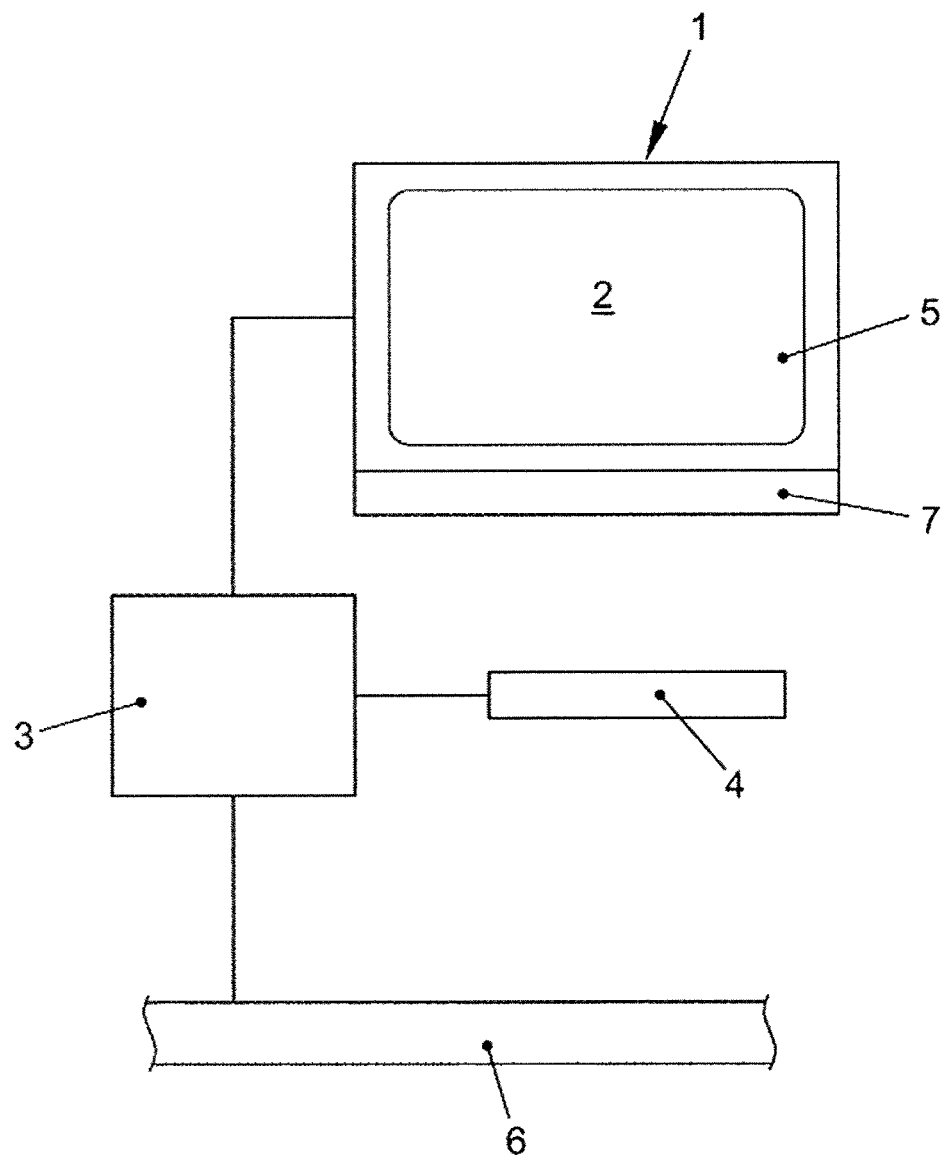
FIG. 1 schematically shows the structure of an exemplary embodiment of the disclosed device and the coupling of this device to other devices in the vehicle.

In the method, if a selection operation has been detected, at least the first graphical object displayed at the top of the stack disappears, with the result that one of the further graphical objects is displayed at the top of the stack after the first graphical object has disappeared, and this object is automatically selected, with the result that the function assigned to this graphical object is performed.

On the one hand, the user can change the displayed subset of the list by means of the selection operation of the disclosed method since the graphical object originally displayed at the top of the stack disappears and another graphical object is displayed at the top of the stack and possibly other graphical objects are displayed in an only partially visible manner perspectively behind this object. On the other hand, not only is the displayed subset of the list changed but the performance of the function of a particular graphical object is also automatically initiated.

As a result of the selection operation, the graphical object originally displayed at the top of the stack is caused to disappear, in particular, and the next graphical object originally displayed directly beneath the topmost graphical object is displayed at the top of the stack. Alternatively, a plurality of graphical objects displayed at the top of the stack are caused to disappear by the selection operation. The number of graphical objects which are caused to disappear by the selection operation can be stipulated in advance, for example. The topmost two, three, four or six graphical objects can then be caused to disappear by the selection operation.

The selection operation may comprise, for example, a swiping gesture which is performed in front of the display surface or on a touch-sensitive surface of the display surface. The swiping gesture can be performed by a user's hand or finger. It is, for example, a horizontal movement of the user's hand or finger which is performed in front of or on a touch-sensitive surface of the display surface. This swiping gesture is detected by a gesture detection device and is converted into the changed display on the display surface. Furthermore, the detected swiping gesture is converted into a control signal which initiates the performance of the function of the object which is now displayed at the top of the stack.

According to one configuration of the disclosed method, if a selection operation has been detected, an animation is displayed in which the first graphical object displayed at the top of the stack is first of all moved away from the stack and then disappears. As a result of such an animation, the observer can intuitively grasp the disappearance of the graphical object, with the result that he can easily orient himself in the display of the list.

According to another configuration of the disclosed method, the possibility of carrying out the selection operation is signaled by means of a symbol or hint object displayed on the display surface. This symbol or hint object means that the user can quickly and intuitively grasp the possibility of this special operation.

According to another configuration of the disclosed method, another graphical object is displayed at the top of the stack by means of a scrolling operation. The graphical object displayed at the top of the stack is marked after the scrolling operation.

In the disclosed method, two different operations are therefore defined in this case. In both operations, another graphical object is displayed at the top of the stack. However, in the selection operation, the object displayed at the top of the stack after the operation is automatically selected, with the result that the function assigned to this graphical object is performed. In contrast, during the scrolling operation, the function assigned to this object is not performed. However, the object is displayed in a marked form. In the case of such a marking, additional information relating to this graphical object can be displayed, for example. However, the function assigned to the object is not performed. As a result of these two operations, the user can easily and quickly determine whether he wishes to only scroll through the graphical objects in the list or whether he wishes to immediately trigger a function with a single selection operation.

In the disclosed device, the control device can be used to control the display surface in such a manner that, if a selection operation has been detected, at least the first graphical object displayed at the top of the stack disappears, with the result that one of the further graphical objects is displayed at the top of the stack after the first graphical object has disappeared, and this graphical object is automatically selected, with the result that the function assigned to this graphical object is performed.

The disclosed device is configured, in particular, in such a manner that it can partially or completely carry out the method steps described above. The device therefore also has the same advantages as the method.

According to one configuration of the disclosed device, the operating device comprises a touch-sensitive surface. The touch-sensitive surface may be arranged on the display surface or separately from this display surface. Either a so-called touchscreen or a so-called touchpad is therefore provided.

According to another configuration of the disclosed device, the operating device comprises a gesture detection device. This gesture detection device can be used to detect the selection operation and possibly the scrolling operation.

The gesture detection device is coupled to the control device and transmits a corresponding signal to the control device after a particular operation has been detected.

Disclosed embodiments also relate to a vehicle, in particular a motor vehicle, having the device described hereinabove.

Figure 2:
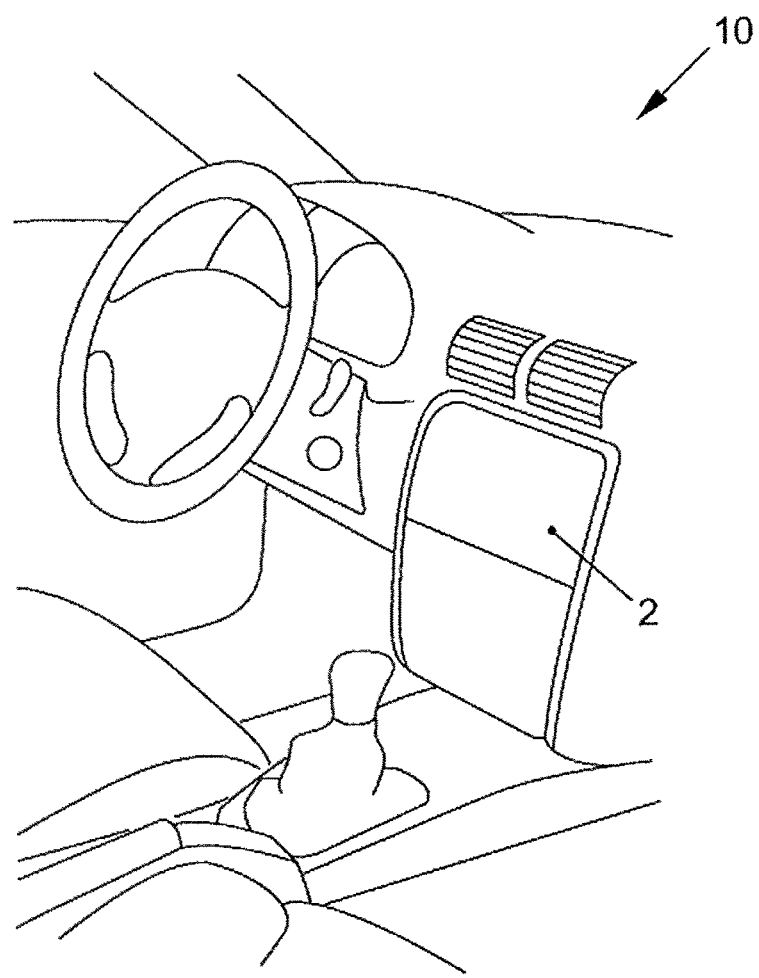
FIG. 2 shows the arrangement of the display device in a vehicle.

The disclosed device comprises a display device 1 with a display surface 2 which is arranged in the interior of the vehicle 10 in such a manner that it is clearly visible to at least one vehicle occupant, in particular the driver, as shown in FIGS. 1 and 2. The display surface 2 may be provided by a display, in particular a liquid crystal display, of any desired design. The display device is coupled to a control device 3.

The control device 3 generates graphics data which can be displayed using the display device 1. For this purpose, the control device 3 is connected to a memory 4 for storing data. The data comprise, in particular, information organized in lists. The list comprises a multiplicity of list entries. A subset of the list entries can be displayed on the display surface 2 of the display device 1 using graphical objects, as explained later. Data relating to functions assigned to the graphical objects or to the list entries in the list are also stored in the memory 4. These data may comprise, for example, control commands which initiate the performance of a particular function.

The control device 3 is also part of an operating device which can be actuated by a user to change the displayed subset of the list by means of an operation, to select a particular graphical object from the list or to mark a graphical object in the list. In the exemplary embodiment shown in FIG. 1, the operating device comprises a touch-sensitive surface 5 which is formed on the display surface 2. The operating device also comprises a gesture detection device 7 which detects particular gestures performed by a user in front of the display surface 2 and converts them into control commands.

Alternatively, the touch-sensitive surface 5 and/or the gesture detection device 7 may be provided separately from the display surface 2. In this case, the operating device therefore comprises a touchpad instead of a touchscreen and the gestures are detected in the area surrounding the touchpad and not in front of the display surface 2.

The control device 3 is also coupled to a data bus 6 of the vehicle 10, via which data can be interchanged with various devices in the vehicle 10. For example, a navigation system and an infotainment system are connected to the data bus 6.

The text below explains, with reference to FIGS. 3 and 4, how the displayed subset of a list can be changed and a graphical object in this list can be selected in at least one exemplary embodiment of the disclosed method. The method can be carried out by the device described hereinabove.

Figure 3:
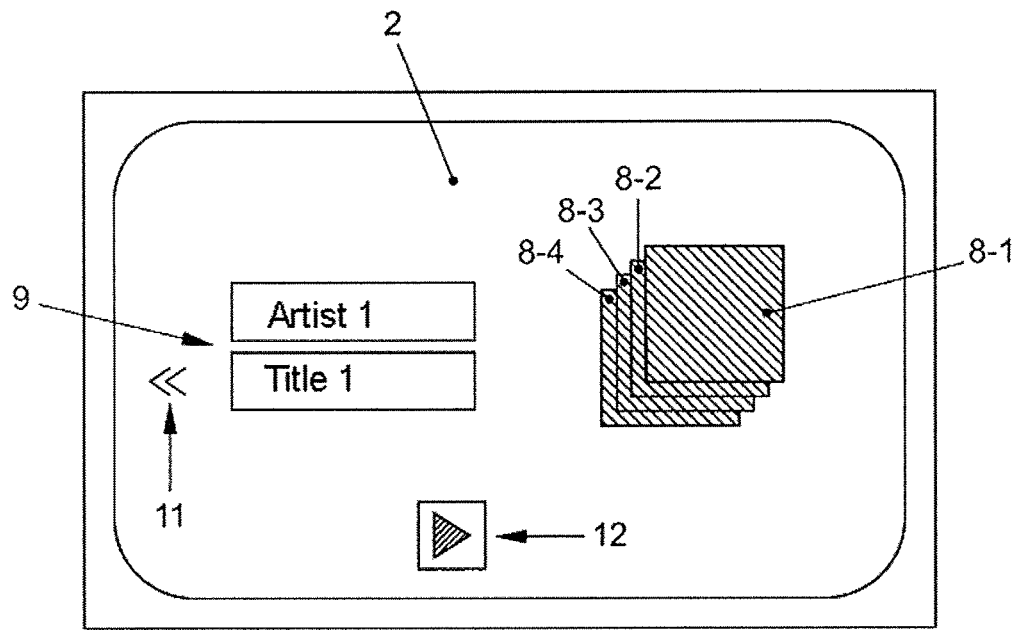
FIG. 3 shows a display of the display device which was generated by an exemplary embodiment of the disclosed method.
Figure 4:
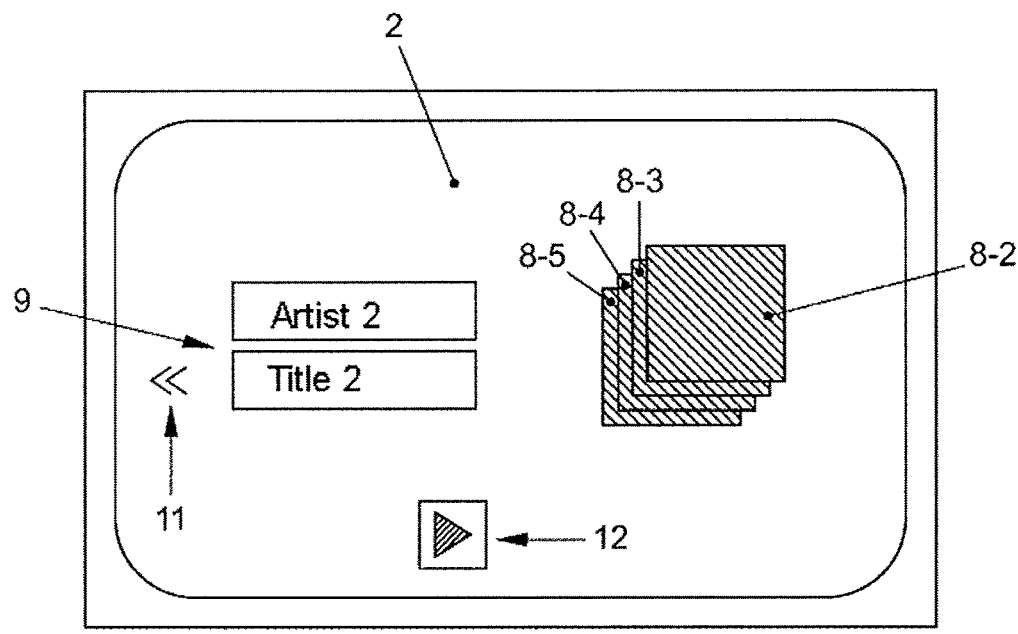
FIG. 4 shows another display of the display device which was generated by an exemplary embodiment of the disclosed method.

As shown in FIG. 3, a plurality of graphical objects 8-1 to 8-4 are displayed as a stack on the display surface 2. The graphical objects 8-1 to 8-4 are also generally denoted with the reference symbol 8 below. The stack is perspectively displayed such that a graphical object, the graphical object 8-1 in FIG. 3, is displayed in a completely visible manner at the top of the stack and further graphical objects, the graphical objects 8-2 to 8-4 in the illustration in FIG. 3, are displayed perspectively behind the graphical object 8-1 displayed at the top of the stack. In this case, the further graphical objects 8-2 to 8-4 are displayed in an only partially visible manner. Only the edges of these graphical objects are seen.

In the example shown in FIG. 3, the graphical object 8-1 displayed at the top of the stack is also selected, that is to say is in a state in which the function assigned to this graphical object 8-1 is performed. In the example described here, audio files are respectively assigned to the graphical objects 8. When a particular graphical object 8-1 is selected, the associated audio file is played back by the infotainment system in the vehicle 10. This is visualized on the display surface 2 by means of a graphical symbol 12. Additional information 9 relating to the selected graphical object 8-1 is also displayed. In this case, these are alphanumeric text displays which denote the artist and title of the audio file assigned to the selected graphical object 8-1.

However, other functions may also be assigned to the graphical objects 8, for example radio stations, geographical locations as destinations of the navigation system or operating states of the vehicle.

The user now has the possibility to change the selection of the graphical object 8 in the list by means of a selection operation. This possibility is visualized by means of a symbol 11 which represents two small arrows. If this symbol 11 is displayed, the possibility for the selection operation exists.

In this exemplary embodiment, the selection operation comprises a swiping gesture by the user. This swiping gesture can be performed on the touch-sensitive surface 5 of the display surface 2. In this case, the swiping gesture is detected by the touch-sensitive surface 5. Alternatively, the swiping gesture may also be performed in front of the display surface 2. In this case, it is detected by the gesture detection device 7. During the swiping gesture, the user moves his hand or a finger in a particular direction. In the present exemplary embodiment, the movement is carried out from right to left, as indicated by the two arrows of the symbol 11.

If such a swiping gesture has been detected, the control device 3 generates graphics data for an animation. During this animation, the graphical object 8-1 displayed at the top of the stack is moved in the direction of the swiping gesture, that is to say to the left in the present case. It may also possibly carry out rotating or pivoting movements which are perspectively illustrated. During this movement, the transparency of the display of the graphical object 8-1 is changed in such a manner that the graphical object 8-1 has completely disappeared at the end of the animation. As shown in FIG. 4, the next graphical object 8-2 is now displayed at the top of the stack. The previous graphical objects 8-3 and 8-4 are displayed behind object 8-2 in an only partially visible manner. Furthermore, a further graphical object 8-5 is displayed at the back in a partially visible manner.

In addition, the control device 3 determines which function is assigned to the graphical object 8-2 now displayed at the top of the stack by accessing the memory 4. The control device 3 changes this graphical object 8-2 now displayed at the top of the stack into a selection state, that is to say the function assigned to this graphical object 8-2 is performed. The audio file assigned to the graphical object 8-2 is therefore now played back by the infotainment system. Furthermore, the additional information 9 containing the corresponding artist and the title is displayed.

As a result of the selection operation, the user has therefore quickly and easily carried out a multiplicity of steps: the playback of the audio file assigned to the graphical object 8-1 was stopped. An animation which visualizes to the user that the graphical object 8-1 is now no longer selected was generated. Another graphical object 8-2 was displayed at the top of the stack. The audio file assigned to this graphical object 8-2 was started and was played back by the infotainment system. This was visualized by means of a graphical symbol 12.

In addition to the selection operation, a scrolling operation can be carried out in the method. The scrolling operation is also initiated by means of a gesture, for example a swiping gesture. For example, the user can perform a swiping movement from top to bottom or from bottom to top. If such a swiping gesture for a scrolling operation is detected, the following steps are earned out by the control device 3: proceeding from the illustration according to FIG. 3, the graphical object 1 displayed at the top of the stack is moved away from the stack. For example, the movement is effected in the direction of the swiping gesture, that is to say up or down. During the animation for this movement, the graphical object 8-1 disappears and the graphical object 8-2 beneath it is displayed on the stack, as shown in FIG. 4. However, this graphical object 8-2 is not selected in this case, but rather is only marked. This means that, although the additional information 9 relating to the graphical object 8-2 is displayed, the audio file assigned to the graphical object 8-2 is not started. Unlike FIG. 3, the symbol 12 is therefore not displayed, but rather another symbol which indicates that the audio file for the graphical object 8-2 can be started by means of a further operation. The disclosed method distinguishes between a selection and a marking of a graphical object.

Different items of information which visually present, in particular, operation-related data relating to the vehicle for the driver are conventionally displayed in a vehicle. Traffic-related data may also be presented for the driver in the vehicle. Analog mechanical display instruments were previously used to display this information. The instruments were arranged, in particular, inside the so-called combination instrument behind the steering wheel in the vicinity of the driver's primary field of vision. The combination instrument is used, in particular, to display the speed, the tank contents, the radiator temperature and other operation-related information relating to the vehicle.

With the increase in electronic devices in the vehicle, it became necessary to display a larger amount of information in the vehicle. Modern vehicles comprise, for example, a multiplicity of driver assistance systems, the information from which must be displayed in the vehicle. Vehicles often also comprise a navigation system. Such a navigation system can be used to display digital geographical road maps with a route and possibly various items of additional information. Finally, modern vehicles often comprise communication and multimedia applications, including a mobile telephone interface, and devices for playing back music and speech. The possibility of displaying information must also exist for these applications in the vehicle.

For this reason, multifunction operating systems are used in vehicles, which systems comprise one or more multifunction display(s) and operating elements which can be used to operate the various devices included in the vehicle. In this case, operation is assisted or guided by the information represented on the multifunction display. The operating system can also be used to select which information is intended to be displayed on the multifunction display.

To be able to flexibly display the various items of information, freely programmable displays, for example, are used and often also represent conventional mechanical instruments. DE 10 2006 032 118 A1 describes, for example, a combination instrument for a motor vehicle, the combination instrument comprising a display which can be used to variably display the speed of the motor vehicle, the rotational speed of the engine of the motor vehicle, the temperature of the engine of the motor vehicle, the tank filling level and/or the time. It is also possible to display information from a navigation system, a telephone, a music system, an infotainment system and/or an air-conditioning system.

In addition to the combination instrument, a display device is often arranged above the center console of the vehicle and can be used to display further information. This display device is used, in particular, as a multifunction display and to display a geographical map of a navigation system. Such a multifunction display is described in DE 199 41 956 A1, for example.

Very special requirements result for displaying information in a vehicle and for operating the various devices in the vehicle. Information absorption and operation are carried out in the vehicle, inter alia, by the driver. The information should therefore be displayed in the vehicle in such a manner that the information absorption by the driver does not result in distraction during the journey. The displayed information should therefore be able to be intuitively and quickly grasped by the driver, with the result that he has to avert his gaze from the driving scenario only very briefly to absorb the information. Likewise, the vehicle devices should he able to he operated as easily and intuitively as possible, with the result that the driver can operate the devices even during the journey. If operation is assisted or guided by a display, the display should be effected in such a manner that the driver has to look at the display only very briefly for operation to carry out operation.

When displaying information in a vehicle, the display and control of information organized in lists are particularly important. On account of the relatively small display surface of the display devices in a vehicle, only a subset of a list is displayed in the vehicle. The user can use an operation to cause scrolling to change the displayed subset. Furthermore, list entries or objects in the list can be selected to initiate the performance of an associated function. The operations related to the control of lists should be able to be carried out very easily and quickly by the driver of the vehicle, for example.

Methods and devices for displaying information organized in lists and for controlling such lists in a vehicle are described in the following publications: DE 10 2008 051 051 A1, DE 10 2008 052 485 A1, DE 10 2009 019 560 A1 and DE 10 2009 019 563 A1.

LIST OF REFERENCE SYMBOLS

1 Display device
2 Display surface
3 Control device
4 Memory
5 Touch-sensitive surface
6 Data bus
7 Gesture detection device
8, 8-1 to 8-5 Graphical objects
9 Additional information
10 Vehicle
11 Symbol
12 Symbol

The invention claimed is:

1. A method for selecting an object from a list, the method comprising:
displaying a subset of a list on a display surface using graphical objects, functions at least partially respectively being assigned to the graphical objects;
displaying the list as a stack in which a first graphical object is completely visible at the top of the stack and further graphical objects are only partially visible perspectively behind the first graphical object; and
selecting one of the further graphical objects by detecting a selection operation, the selection operation including a first swipe operation and a second swipe operation that is different from the first swipe operation;
wherein, in response to the first swipe operation being detected, the one of the further graphical objects is displayed at the top of the stack and additional information about that object is displayed but a function assigned to the one of the further graphical objects is not performed; and
wherein, in response to the second swipe operation being detected, (i) at least the first graphical object displayed at the top of the stack disappears, the one of the further graphical objects is displayed at the top of the stack after the first graphical object has disappeared, and (ii) the one of the further graphical objects is automatically selected to perform the function assigned to the one of the further graphical objects.

2. The method of claim 1, wherein the selection operation is performed in front of the display surface or on a touch-sensitive surface of the display surface.

3. The method of claim 1, wherein, if a selection operation has been detected, an animation is displayed in which the first graphical object displayed at the top of the stack is first of all moved away from the stack and then disappears.

4. The method of claim 1, wherein the possibility of carrying out the selection operation is signaled by a symbol displayed on the display surface.

5. The method of claim 1, wherein the first swipe operation includes a vertical scroll operation, and the one of the further graphical objects displayed at the top of the stack is marked after the first swipe operation.

6. A device for selecting an object from a list, the device comprising:
a display device with a display surface;
a memory for storing a list, which comprises a multiplicity of graphical objects which can be at least partially displayed on the display surface, and for storing functions assigned to the graphical objects;
a control device which is coupled to the display device controls the display represented on the display surface such that a subset of the list is displayed using graphical objects, the list being displayed as a stack in which a first graphical object is completely visible at the top of the stack and further graphical objects are only partially visible perspectively behind the first graphical object; and
an operating device which can be actuated by a user to select one of the further graphical objects by using a selection operation, the selection operation including a first swipe operation and a second swipe operation that is different from the first swipe operation;
wherein the control device controls the display surface such that, (i) in response to the first swipe operation being detected, the one of the further graphical objects is displayed at the top of the stack and additional information about that object is displayed but a function assigned to the one of the further graphical objects is not performed, and (ii) in response to the second swipe operation being detected, at least the first graphical object displayed at the top of the stack disappears, the one of the further graphical objects is displayed at the top of the stack after the first graphical object has disappeared, and the one of the further graphical objects is automatically selected as to perform the function assigned to the one of the further graphical objects.

7. The device of claim 6, wherein the operating device comprises a touch-sensitive surface.

8. The device of claim 6, wherein the operating device detects a gesture detection device.

9. A vehicle having a device as claimed in claim 6.

* * * * *